US006106932A

United States Patent [19]

Carides et al.

[11] Patent Number: 6,106,932

[45] **Date of Patent: *Aug. 22, 2000**

[54] LASER IMAGE SUBLIMATION IN SCRATCH-OFF COATING APPLICATIONS

[75] Inventors: James J. Carides, Lawrenceville; Benny R. Rich, Oakwood, both of Ga.

[73] Assignee: Dittler Brothers, Inc., Oakwood, Ga.

[ * ] Notice: This patent is subject to a terminal disclaimer.

[21] Appl. No.: 09/132,387

[22] Filed: Aug. 11, 1998

Related U.S. Application Data

[63] Continuation-in-part of application No. 08/881,328, Jun. 24, 1997, Pat. No. 5,925,440.

[51] Int. Cl.[7] .......... B32B 3/00

[52] U.S. Cl. .......... 428/195; 428/29; 428/192; 428/207; 428/403; 283/94; 283/100; 273/269

[58] Field of Search .......... 428/195, 29, 192, 428/207, 403; 283/94, 100, 901, 903; 273/269

[56] References Cited

U.S. PATENT DOCUMENTS

| | | | |
|---|---|---|---|
| 3,567,482 | 3/1971 | George et al. | 117/117 |
| 5,569,512 | 10/1996 | Brawner et al. | 428/29 |
| 5,925,440 | 7/1999 | Farag et al. | 428/195 |

*Primary Examiner*—Deborah Jones
*Assistant Examiner*—Abraham Bahta
*Attorney, Agent, or Firm*—Dean W. Russell; Geoff L. Sutcliffe; Kilpatrick Stockton LLP

[57] ABSTRACT

A method and system for creating game cards incorporates a removable scratch-off coating to hide printed symbols. The card is constructed so that the scratch-off coating is selectively retained by the card, in the form of symbols, when the scratch-off coating is removed. The selective retention of scratch-off coating material to the card is accomplished by incorporating into the card, between the substrate and the scratch-off coating, a clear release coat laser-engraved to form symbols. A laser creates the desired symbols in the release coat. The laser may be manually controlled or computer-controlled using software and drivers for the laser assembly. When the scratch-off coating material is applied to the card during construction, it adheres directly to the substrate in the form of symbols. When a player rubs the scratch-off coating material, it releases from the release coat and remains adhered to the substrate to create the symbols.

9 Claims, 3 Drawing Sheets

FIG. 1
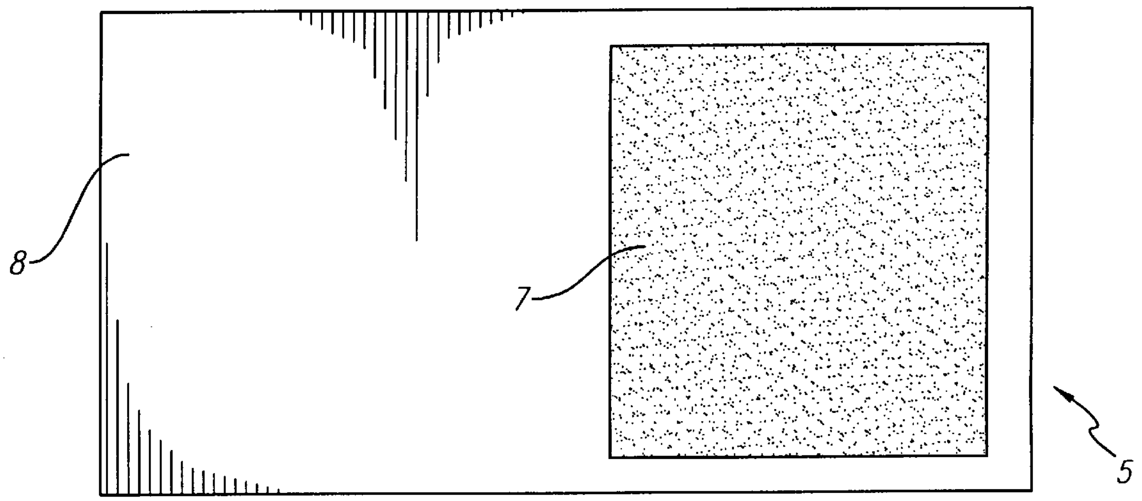
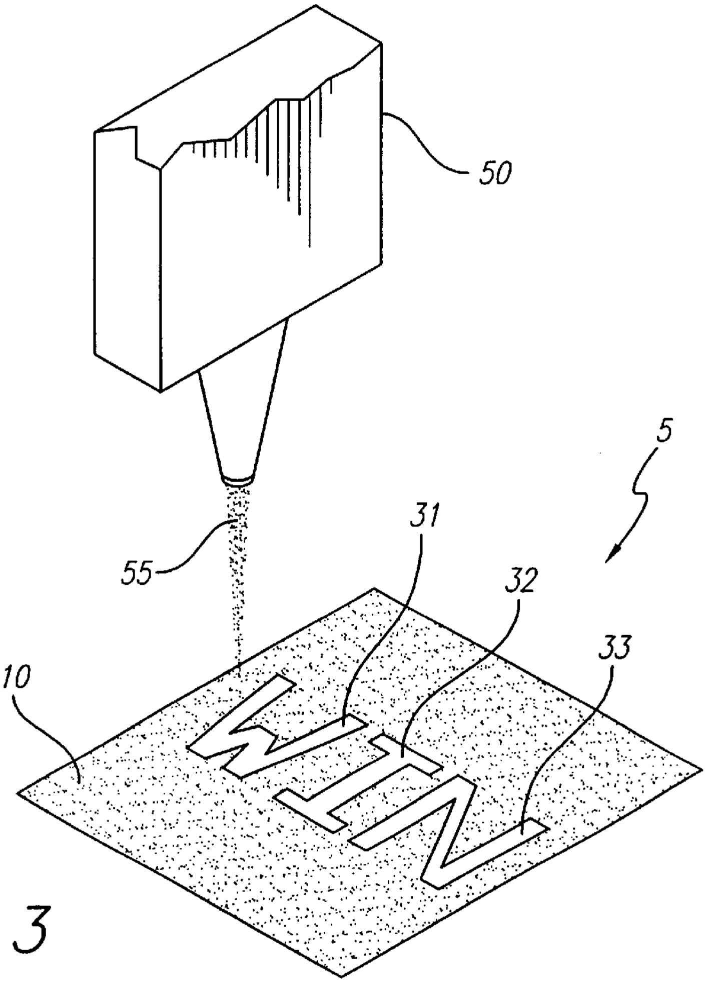
FIG. 3

FIG. 4
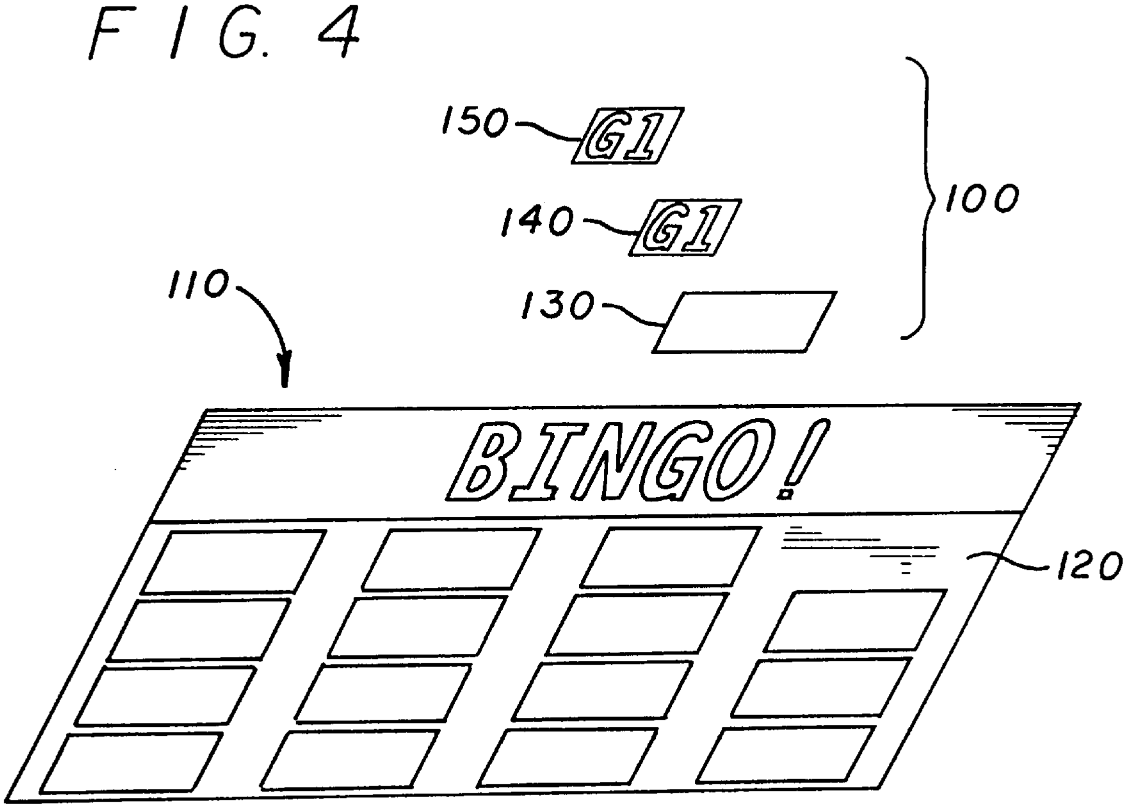
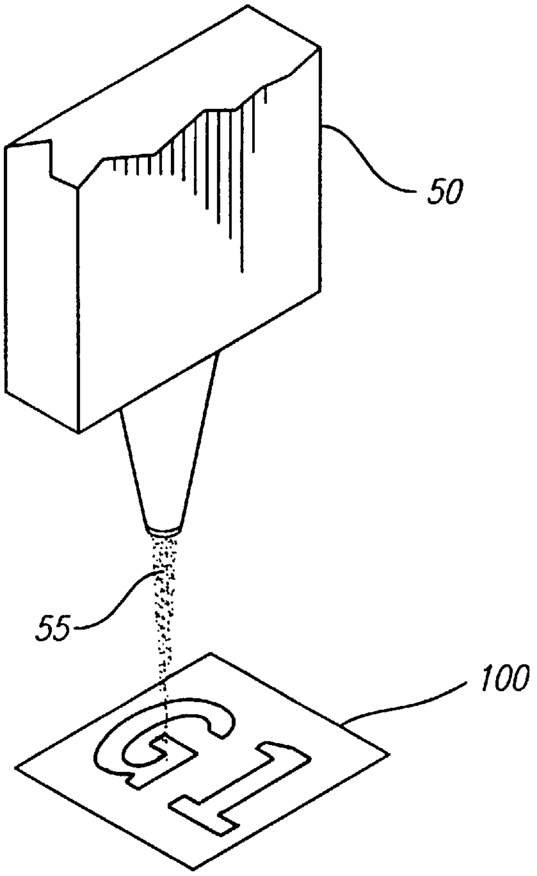
FIG. 5

LASER IMAGE SUBLIMATION IN SCRATCH-OFF COATING APPLICATIONS

PRIOR APPLICATIONS

This application is a continuation-in-part of U.S. pat. application Ser. No. 08/881,328, filed Jun. 24, 1997, entitled "Image Sublimation now U.S. Pat. No. 5,925,440."

BACKGROUND OF THE INVENTION

1. Field of the Invention

The present invention is directed to removable scratch-off coatings and items that incorporate scratch-off coatings to obscure images from view. More particularly, the present invention is directed to the use of laser technology to sublimate images beneath the scratch-off coatings.

2. Background

Many instant-win lottery cards are coated in one or more regions by scratch-off coating compositions in order to hide symbols that comprise game indicia. When a purchaser of such a card scratches off the coating, he or she reveals the symbols and learns the results of the game. Instant-win tickets, phone cards, promotional labels and other games similarly incorporate scratch-off coatings to hide various symbols.

Instant-win lottery cards, like other games that incorporate scratch-off coatings, typically are layered with a complex array of coatings of varying compositions. The complex construction provides a card that is both durable and relatively secure from tampering. U.S. patent application Ser. No. 08/407,185 now U.S. Pat. No. 5,569,512 (which application is hereby incorporated by reference herein) discloses several arrays of coatings that a card can incorporate.

The substrate, or base, of many instant-win lottery cards is cut from cellulosic board stock. A metallic foil is then laminated to the board stock. The metallic foil is coated with a primer to minimize oxidation and to provide a surface that is receptive to ink. After symbols have been printed atop the primer in pigmented ink, a sealant is frequently applied over them to protect the printed symbols. A scratch-off coating, which typically is comprised of an opaque metallic latex, is applied over the printed symbols and sealant to obscure the symbols from view. To facilitate removal of the scratch-off coating from the card, existing cards often further include at least one "release" coat interposed between the scratch-off coating and ink sealant.

In addition to providing a durable substrate for the production of instant-win cards, a cellulosic board stock and foil combination provides a level of opacity and impermeability that is important to the security of the card. The board stock and foil combination inhibits unscrupulous players from viewing the printed symbols by examining the ticket before a light source, a process known as candling. The non-porous foil also protects the card from chemical tampering by preventing unscrupulous players from chemically wicking the hidden symbols to the underside of the substrate where they might become visible.

While existing foil-based cards may be durable and secure, they are difficult and expensive to manufacture because they are constructed of numerous coatings and layers. Many times these coatings and layers are comprised of specialty chemicals to ensure that the layers are compatible with and adhere to one another. These specialty chemicals are often very expensive. The foil in foil-based cards is another significant raw material expense, and it adds an element of complexity to the manufacturing process. Foil-based cards also are difficult to recycle because the metal foil interferes with conventional paper recycling processes. The foil further prevents electrostatic printing techniques from being employed, reducing the variety of graphics available for use. The use of ink to print the symbols is also problematic. Ink printing requires that two additional processing steps be incorporated into the card manufacturing process, one printing step and another sealant step. Each of these steps substantially increases the time and expense required to manufacture existing cards.

An instant-win card that is different from those discussed above was recently introduced. This card appears to omit foil from its base, and instead to incorporate a water-based black coating over the conventional board stock. The black coating is approximately one micron thick and comprised of carbon, chlorine, and calcium. This black coating is believed to be either identical or virtually identical visually to the composition of the ink used to print the hidden images on the card thus diminishing the possibility that an unscrupulous player could distinguish the hidden images from the coating through candling. To contrast the hidden images from the black base coating, and to receive more readily printed symbols, the card interposes a lighter color coating between them. This card however, like others discussed above, is complex.

SUMMARY OF THE INVENTION

The present invention provides a method and system for printing symbols that uses laser engraving rather than ink as in prior art methods. Therefore, it is not necessary to disguise the ink or physically to protect the ink from the tampering process. In one embodiment, the card is constructed so that the scratch-off coating is selectively retained by the card, in the form of symbols, when the bulk of the scratch-off coating material is rubbed off the card. The scratch-off coating material effectively becomes the medium used to print legible symbols. The selective retention of scratch-off coating material to the card in the form of symbols is accomplished by incorporating into the card, between the substrate and the scratch-off coating, a clear release coat having voids in it in the form of symbols. The voids are created by a laser apparatus that may be manually controlled or computer-controlled using the appropriate software and drivers. A beam from the laser strikes the release coating to quickly and accurately create the voids. When the scratch-off coating material is applied to the card over the release coat, it adheres directly to the substrate through the voids in the release coat in the form of symbols. When a player rubs the scratch-off coating material, it releases from the areas where the release coat is applied and remains adhered to the substrate in the form of symbols where the release coat is not applied.

In another embodiment of the present invention, the laser engraving may be applied to the card after the scratch-off coating has been applied. This method is applicable to situations where the consumer must identify the symbol before removing it (e.g., BINGO). In this embodiment, the release coat is first applied to the substrate. Following the application of the release coat, the scratch-off coating is applied. The laser is then used to remove portions of both the release coat and the scratch-off coating material. As a result, the laser is used as a marking device. The player may clearly see the indicia prior to playing as a substrate-colored image on a scratch-off coating background. When the scratch-off coating is removed, the image is contrasted against the release coat background.

The use of the laser offers several advantages. First, the laser is less expensive to use over time than costly inks and dyes. This cost is further reduced by the use of fewer overall layers in the card composition. Second, the laser may be controlled more accurately than standard ink jet printing techniques. Thus, the likelihood of expensive printing mistakes is greatly reduced. The computer-controlled laser also allows the repeated creation of identical symbols. Third, the because the release coat is typically clear, an unscrupulous player is less likely by candling to discern the symbols in an item produced according to the present invention. And since ink is not employed to print the hidden symbols, unscrupulous players are less able to compromise the game prematurely through chemical wicking.

Accordingly, it is an object of the present invention, to construct a simple instantwin game that incorporates a removable scratch-off coating that does not contain a complex array of layers and coatings.

It is also an object of the present invention to construct an instant-win card that incorporates a removable scratch-off coating that inhibits candling and other means of tampering that prematurely compromise the game.

It is an additional object of the present invention to overcome the need for ink to produce legible symbols in a game card.

It is still a further object of the present invention to reduce error in the creation of symbols on a game card.

It is yet another object of the present invention to provide a method for constructing a game card that can be easily repeated.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 1 illustrates a card constructed according to one preferred embodiment of the present invention.

FIG. 3 illustrates an apparatus for creating voids in the card of FIG. 2, according to one preferred embodiment of the present invention.

FIG. 4 illustrates a card constructed according to another preferred embodiment of the present invention.

FIG. 5 illustrates an apparatus for creating voids in the card of FIG. 4, according to another preferred embodiment of the present invention.

DETAILED DESCRIPTION

Figure 2:
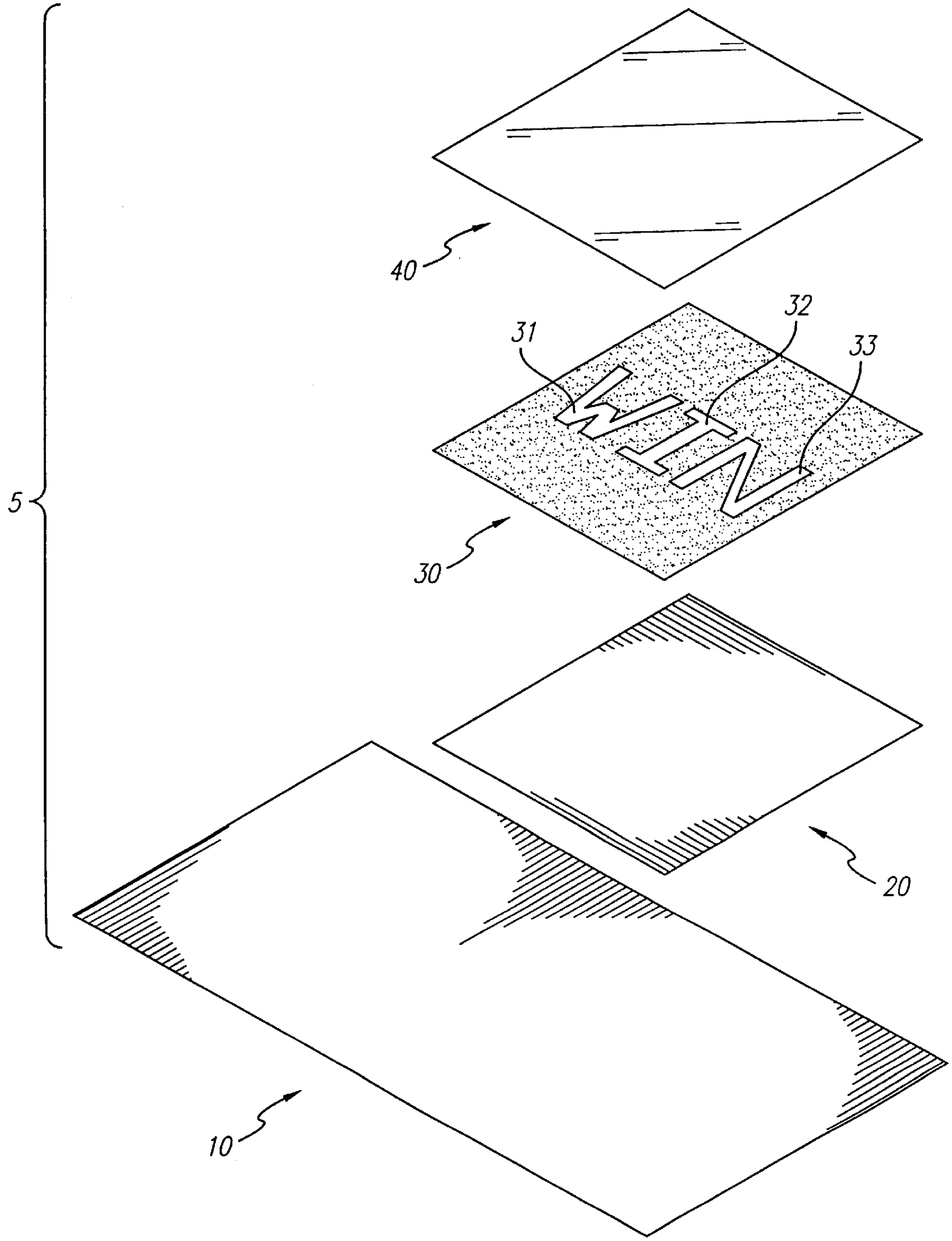
FIG. 2 illustrates layers of the card shown in FIG. 1.

Reference will now be made in detail to a preferred embodiment of the invention, examples of which are illustrated in the accompanying drawings. Wherever possible, the same reference numbers will be used throughout the drawings to refer to the same or like parts.

FIG. 1 illustrates a card 5 constructed according to one preferred embodiment of the present invention. The card 5, configured as an instant-win lottery card, is divided into secure and unsecure areas 7 and 8, respectively. Promotional material to which the player is first exposed typically is printed in unsecure area 8. Promotional material also may be printed atop secure area 7. Legible symbols that inform a player of the results of the game are hidden by the scratch-off coating material contained in the secure area 7 of card 5.

A player reveals the hidden symbols in secure area 7 by removing the scratch-off coating material.

As illustrated in FIG. 2, card 5 is constructed of several layers and coatings. Layer 10 forms the substrate, or base play, of card 5. Eight or ten point board stock typically is used as the base play in instant-win lottery cards and because of its durability and structural rigidity is suitable for use as the substrate in cards of the present invention. Durability and structural rigidity are not critical to the invention, however, and lighter paper such as 60 lb. paper also can be employed. Indeed, because the scratch-of coating does not have to be as thick as the scratch-off coating in other cards (as will be discussed later in this specification), lighter and less expensive substrates can be used readily with this invention. Although foil conceivably could be laminated to the board stock, card 5 of the present invention omits foil so that it is simpler and more readily recycled. Indeed, base layer 10 itself may be constructed of recycled fibers. Alternatively, other materials, both natural and synthetic, can be used for the substrate without departing from the scope or spirit of this invention. Any substrate material can be employed that provides a surface that can retain the layers applied to the card and that provides the rigidity and strength to withstand forces applied to the card during processing, handling, and use of the item or game.

Much commercially available substrate material is not suitably colored to receive printed symbols and to provide a visible contrast with such symbols. In addition, the rough texture of most commercially available board stock makes it ill-suited to receive printed symbols directly, especially symbols that are finely detailed and defined. Moreover, commercial board stock and other substrate materials may be incompatible with certain printing media. A primer may be employed to overcome such problems. In FIG. 2 a primer, shown as layer 20, is coated over the substrate 10 to receive printed symbols more readily and to create a better contrast with which to view printed symbols. A suitable primer is adapted to adhere to base ply 10, to receive the scratch-off coating material composition, and to resist separating from the base ply 10 when the scratch-off coating material is removed. In addition, the primer must be capable of receiving the composition of release coat 30 that is also applied to the primer.

Many compositions and types of materials are suitable for use as a primer. The primer may be a sheet of material adhered to the base ply, or it can be a coating chemically or otherwise applied over the base ply. Many compositions of commercially known and available coatings are suitable for use as primers in cards of the present invention, including primers that are used in existing cards. A suitable composition of primer 20, that can be applied to a cellulosic substrate, is a vinyl chloride resin dissolved in acetate solvent with titanium dioxide pigment. Other pigments or colorants can be added to the primer to impart the desired color to the primer, to best contrast the primer with the scratch-off coating material.

Release coat 30 is applied over primer 20 so that a player can rub scratch-off coating 40 from the card 5 where release coat 30 is applied. In the embodiment shown in FIG. 2, release coat 30 also acts as the negative pattern through which scratch-off coating material is adhered selectively to the primer 20 in the form of predetermined symbols. Voids in release coat 30 in the form of symbols dictate the symbols that appear on the card 5 when a player removes scratch-off coating 40. Exemplary voids 31, 32, and 33, in the form of symbols, "W", "I" and "N", are shown in the release coat 30 of card 5. When scratch-off coating is applied to card 5 during construction, it adheres to the release coat 30, but also adheres directly to primer 20 at voids 31, 32, and 33 in the form of the symbols "W", "I" and "N." When the scratch-off coating 40 is separated from the release coat 30 by rubbing, the material from scratch-off coating that was adhered to the primer 20 remains adhered thereto at the interface between the scratch-off coating and the primer, revealing imprinted symbols "W", "I" and "N".

FIG. 3 illustrates an apparatus for creating the voids 31, 32, and 33 in release coat 30. The apparatus includes a laser 50, such as a $CO^2$ laser, although any laser emitting a surface-penetrable beam may be used. The laser 50 is preferably mounted within a proximity of the release coat 30. The laser 50 emits a high-powered beam 55 that strikes the release coat 30 to remove portions of the release coat. As shown in FIG. 3, the beam 55 is focused on release coat 30. The laser apparatus 50 may be controlled manually or computer-controlled to remove selected portions of the release coat 30. If the laser 50 is manually controlled, preferably a template (not shown) is used. If the laser 50 is computer-controlled, the computer determines the mechanical motion of the emitted beam 55. The computer may include appropriate software to control the movement of the laser apparatus 50, and drivers translate machine code instructions directly to the laser apparatus 50. As the beam 55 strikes the release coat 30 in accordance with the manual or computer-controlled direction, the intensity of the beam is increased. As a result of the varying intensities, portions of the release coat 30 are obliterated to create the voids 31, 32, and 33. Once the release coat 30 has been removed in the desired parts, the remaining scratch-off coating 40 may be applied.

Other types of lasers or similar obliterating devices may also be used. For example, a single-guided laser may be employed to remove the voids shown in FIG. 2. The beam of the laser may be guided using a mirror or other reflective mechanism. Similarly, a phased pulse laser together with a conveyor belt may be used for obliterating the various layers of the card.

In another preferred embodiment, the laser apparatus 50 may be used for post-release coating images to game indicia clearly for a player. FIG. 4 illustrates a BINGO card 110 having a plurality of game regions 100 arranged in parallel columns. The card 110 includes a base substrate layer 120 made with material similar to the material for the layer 10 described above. An optional primer, shown as layer 130, is coated over the substrate 120 to receive printed symbols. Release coat 140 is applied over primer 130 so that a player can rub scratch-off coating 150 from the card 110 where release coat 140 is applied. This process is repeated for each game region 100.

Once scratch off-coating 150 has been applied, laser apparatus 50 may be employed to obliterate portions of release coat 140. FIG. 5 illustrates the modification of each game region 100. First, the beam 55 from laser apparatus 50 is aimed at the selected game region 100. As discussed above, the beam may be controlled manually. Preferably, however, the beam is computer-controlled using software and hardware drivers stored on the computer. In accordance with the software directions (or manual control), the beam obliterates both the scratch-off coating and release coating in the shape of the desired game indicia. In FIG. 5, BINGO number "GI" is removed from the game region 110.

When completed, the card includes a plurality of game regions 110 with markings that clearly indicate the material underneath. Each game region 110 reveals itself as a scratch-off colored image on a substrate/primer colored field. When the number is called by an announcer, the player may remove the scratch-off coating. The removal of the scratch-off coating leaves the release coating voids against the primer background.

Having thus described a preferred embodiment of a method and apparatus for laser image sublimation, it should be apparent to those skilled in the art that certain advantages have been achieved. It should also be appreciated that various modifications, adaptations, and alternative embodiments thereof may be made within the scope and spirit of the present invention. The invention is further defined by the following claims:

What is claimed is:

1. An item comprising:

a surface;

a laser-engraved release coat applied to the surface, the laser engraving defining at least one symbol; and a coating material applied to the surface and the release coat, the coating material releasing from the release coat when a person removes the coating material.

2. The item, as recited in claim 1, wherein the item is a game card.

3. The game, as recited in claim 1, wherein the release coat is engraved by a manually-controlled laser.

4. The game, as recited in claim 1, wherein the release coat is engraved by a computer-controlled laser.

5. The game, as recited in claim 1, further comprising a primer coat applied to the surface.

6. An item comprising:

a surface;

a laser-engraved release coat applied to the surface, the laser engraving defining at least one symbol; and a laser-engraved coating material applied to the surface and the release coat, the laser engraving defining the at least one symbol and the coating material releasing from the release coat when a person removes the coating material.

7. The item, as recited in claim 6, wherein the item is a game card.

8. The game, as recited in claim 7, wherein the release coat and the coating material are applied to the surface in a plurality of game regions.

9. The game, as recited in claim 8, wherein each game region includes a different laser-engraved symbol in the release coat and the coating material.

* * * * *

UNITED STATES PATENT AND TRADEMARK OFFICE
CERTIFICATE OF CORRECTION

PATENT NO. : 6,106,932
DATED : August 22, 2000
INVENTOR(S) : James J. Carides and Benny R. Rich It is certified that error appears in the above-identified patent and that said Letters Patent is hereby corrected as shown below:

Column 3,
Line 14, insert a hyphen between "instant" and "win."

Column 6,
Line 6, Delete "GI" and substitute -- G1 -- therefor.

Signed and Sealed this

Nineteenth Day of February, 2002

*Attest:*

JAMES E. ROGAN
*Director of the United States Patent and Trademark Office*

*Attesting Officer*